V. J. WEINBERGER,
MANIFOLD HEATER.
APPLICATION FILED APR. 12, 1918.
1,324,707.
Patented Dec. 9, 1919.
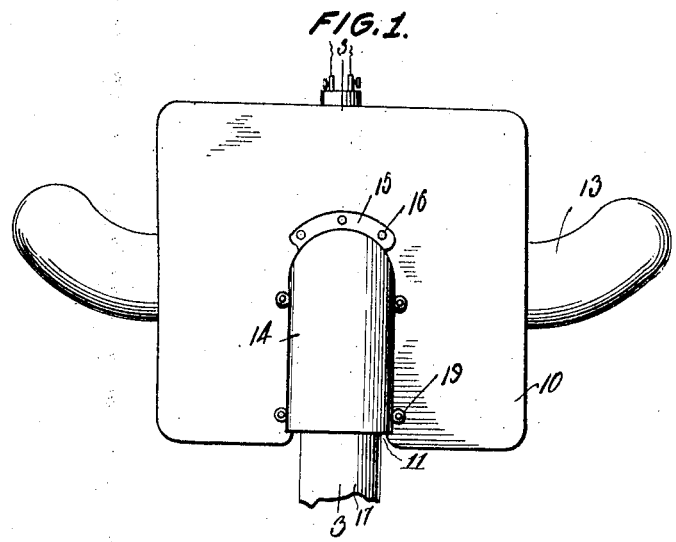
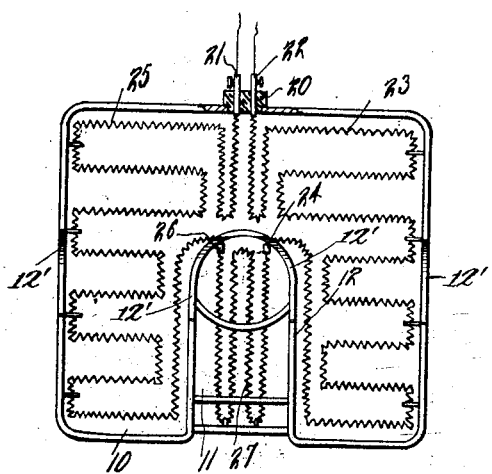
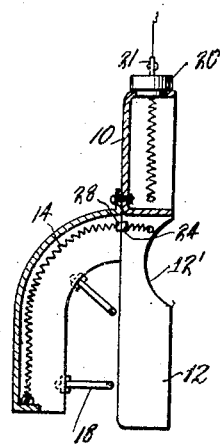
INVENTOR
Vaughan J. Weinberger
WITNESSES
BY
ATTORNEY

UNITED STATES PATENT OFFICE.

VAUGHAN J. WEINBERGER, OF KENMARE, NORTH DAKOTA.

MANIFOLD-HEATER.

1,324,707.  Specification of Letters Patent.  Patented Dec. 9, 1919.

Application filed April 12, 1918. Serial No. 228,179.

*To all whom it may concern:*

Be it known that I, VAUGHAN J. WEINBERGER, a citizen of the United States, residing at Kenmare, in the county of Ward and State of North Dakota, have invented certain new and useful Improvements in Manifold-Heaters, of which the following is a specification.

This invention has relation to improvements in internal combustion engines, and particularly engines for use in motor vehicles, and the nature and objects thereof will be readily apparent to those skilled in the art to which it appertains, in the light of the following explanation of the accompanying drawings, illustrating what I now believe to be the preferred embodiment or mechanical expression, of my invention from among other forms and arrangements within the spirit thereof, or the scope of the appended claims.

An object of the invention is to provide primarily a heater for the intake manifold of the engine of a motor vehicle whereby to elevate the temperature of the charge prior to its introduction into the cylinders to insure proper and perfect combustion and for other purposes.

Another object of the invention is to provide a manifold heater operable by electric current to maintain a region of comparatively high temperature around the intake manifold for the purpose above set forth.

A still further object of the invention is to provide a manifold heater for the purpose above set forth including a casing open at one side and formed with recesses to partly receive the manifold, and a substantially semi-cylindrical casing forming a part of the heater to partly encompass the branch of the manifold to insure heating of the charge immediately subsequent to its issuance from the carbureter.

A still further object of the invention is to provide an electric heater for intake manifolds of the character above set forth embodying a new and novel arrangement of an electric heating element whereby to secure a uniform and proper distribution of heat.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

Figure 1. is a view in front elevation of a manifold heater constructed in accordance with my invention, illustrating its application to an intake manifold.

Fig. 2, is a view of the heater *per se* in rear elevation, and

Fig. 3, is a view of the heater in vertical section taken on the line 3—3 of Fig. 1.

With reference to the drawings, 10 indicates the main casing which is open at its rear face, and is substantially rectangular in configuration, and somewhat shallow. The casing 10 is formed with a laterally extending recess 11 extending into the center of the casing, and is defined by walls 12 forming a continuation of the walls of the casing 10. The side walls of the casing and the walls 12 are cut away as at 12' so as to receive the horizontal or connecting portion 13 of the intake manifold. Secured to the exterior face of the casing 10 is an arcuate casing 14 substantially semi-circular in cross section, and provided at one end with an integrally formed flange 15 which is designed to engage the exterior surface of the casing 10 to be secured thereto by means of bolts 16 which enter apertures in the flange and openings in the casing. It will be obvious from Fig. 3 that the arcuate casing 14 is so secured to the casing 10 as to permit the branch 17 of the intake manifold to lie within the casing 14. U-bolts 18 are provided at their terminals entering apertured ears 19 formed upon the edges of the arcuate casing 14 whereby to engage the under side of the branch 17 to secure the arcuate casing in place.

Mounted upon the upper edge of the casing 10 in an opening provided therein is a block 20 of insulating material having a pair of binding posts 21 and 22 mounted therein. A strand of high resistance wire 23 is mounted within the casing 10 at one side of the vertical center, having one end of the shaft connected to the binding post 22 and then trailed back and forth within the casing with its opposite terminal secured to a stationary contact 24 mounted within the recess 11 adjacent the center of the main casing. A second strand of resistance wire 25 is provided having one end connected to the other binding post 21 and trailed back and forth within the casing at the side thereof, opposite the side occupied by the strand 23. The opposite end of the strand 25 is then connected to a stationary contact 26 mounted in opposed relation to the contact 24 and within the recess 11. A third strand of high resistance wire 27 is then trailed back and forth within the arcuate casing 14 in a direction longitudinally thereof with intermediate loops of the strand securely anchored by any suitable means, and the terminals of the strand secured to stationary contacts in one end of the arcuate casing 14 designed for engagement with the contacts 24 and 26.

In use, the manifold heater is applied to the manifold as illustrated in Fig. 1, permitting the horizontal portion of the manifold to enter the recess 14 and the vertical band 17 of the manifold to enter the arcuate casing 14 of the manifold casing. The U-bolts 18 are then applied to the under side of the manifold and to the arcuate casing 14 to secure the manifold heater in place. Current is then introduced into the binding posts 21 and 22 and it will be readily seen that the current may traverse a path including the strand 23, strand 27, returning through the strand 25 to the binding post 21. If desired the arcuate branch 14 may be disengaged from the main casing to facilitate removal of the heater for repairs without removing the main casing as an entirety. When the arcuate branch is reapplied, the strands 27 therein would be automatically placed in series with the strands 23 and 25 by engagement of the contacts 24, 26 and 28 in the manner above stated.

Thus it will be seen that I have provided a unique manifold of extremely simple character, comprising few parts which may be readily manufactured and assembled, thereby permitting the devices to be made economically and in quantities. It will be apparent that by the use of this device, the intake manifold may be heated when desired. The heating of the manifold may be continuous during the winter time in order to insure the proper treatment of the charge and in the summer time the manifold may be heated only until the engine has run for a time sufficient to supply its own heat to the radiator whereupon the supply of current to the manifold heater may be disconnected.

Having thus described my invention what I claim as new and desire to secure by Letters Patent is:—

1. An intake manifold heater comprising a plate having a vertical opening extending from the lower edge to a point adjacent the center, a flange formed on one face of the plate and extending around the edges of the plate and vertical opening, and a heating element received between the flanges.

2. An intake manifold heater comprising a plate having a vertical opening extending from the lower edge to a point adjacent the center, a flange formed on one face of the plate and extending around the edges of the plate and vertical opening, said flanges having longitudinal alined recesses formed therein, and a heating element received between the flanges.

3. An intake manifold heater comprising a plate having a vertical opening extending from the lower edge to a point adjacent the center, an arcuate casing secured to one face of the plate over the vertical opening, a flange formed on the opposite face of the plate and extending around the edges of the plate and vertical opening, a heating element received between the flanges, and a heating element received in the arcuate casing.

4. In combination with an intake manifold comprising a vertical pipe and substantially horizontal extensions, a heater, said heater comprising a plate having a vertical opening to receive the vertical pipe, an arcuate casing secured to one face of the plate, over the vertical opening to inclose the vertical pipe, a flange formed on the opposite face of the plate and extending around the edges of the plate and vertical opening, said flanges having longitudinal alined recesses formed therein for receiving the substantially horizontal extensions of the vertical pipe, a heating element received between the flanges, a heating element received in the arcuate casing, and means for securing the heater to the manifold.

In testimony whereof I affix my signature in presence of two witnesses.

VAUGHAN J. WEINBERGER.

Witnesses:
 BESSIE WEINBERGER,
 J. B. WEINBERGER.